May 12, 1936.  C. W. ICKES ET AL  2,040,312
AIR BRAKE
Filed Jan. 24, 1935
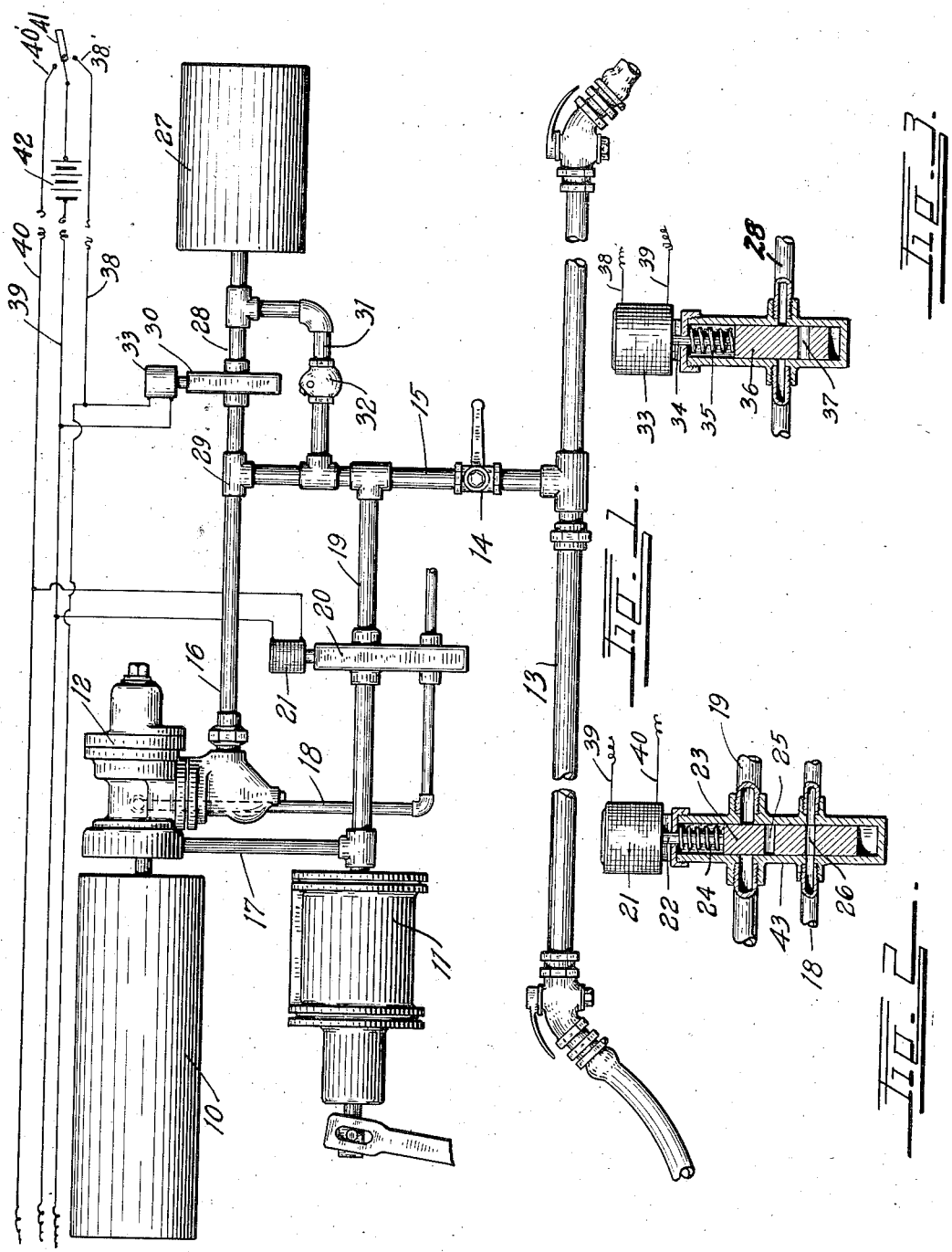
INVENTOR.
CLARENCE W. ICKES
THEODORE P. ICKES
BY
ATTORNEY.

Patented May 12, 1936

2,040,312

UNITED STATES PATENT OFFICE 2,040,312

AIR BRAKE

Clarence W. Ickes and Theodore P. Ickes,
Monte Vista, Colo.

Application January 24, 1935, Serial No. 3,214

4 Claims. (Cl. 303—15)

This invention relates to an improvement in air brakes for railway trains. With the present brake systems, it is practically impossible to simultaneously apply the brakes throughout the length of a long train. When the brakes are applied, those on the engine and the front cars will precede those on the rear cars, causing the cars to pile together, resulting in damage to rolling stock and freight. When the brakes are released, they release first upon the front of a long train, allowing the front cars to pull away and run out the stack to toward the rear of the train. This also results in damage to rolling stock and freight.

The principal object of this invention is to provide a simple mechanism which will enable the engineer to simultaneously apply and simultaneously release all of the brakes throughout the entire length of a train, regardless of the length thereof, thus holding the cars constantly in their relative positions without piling or slacking.

Other objects of the invention are: to provide simultaneous application and release means which will not in any way interfere with the installation and use of the present brake systems and which will require only minor additions thereto; which will allow cars not equipped with the invention to be used in trains with equipped cars; which will allow the train line and auxiliary reservoirs to be recharged without releasing the brakes; which will be economical in the use of air; and which will be inexpensive to install and operate.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates a typical railway car brake piping system with the invention applied thereto.

Fig. 2 is a detail vertical section through the service valve employed in the invention.

Fig. 3 is a similar section through the releasing valve.

In Fig. 1, the usual parts of an air brake system are designated by numerals as follows: auxiliary reservoir 10, brake cylinder 11, triple valve 12, brake pipe 13, cut out cock 14. The triple valve 12 is preferably connected immediately opposite the auxiliary reservoir 10, and is connected to the brake pipe 13 through a lateral pipe 15, and a triple valve pipe 16. The brake cylinder 11 is connected by means of a brake cylinder pipe 17 to the triple valve. The exhaust from the triple valve is conducted through an exhaust pipe 18.

As thus far described, this system is identical in connections and in use to the usual air brake system. Should the engineer decide to apply the brakes with such a system he reduces the pressure in the brake pipe 13 through his engineer's valve. The reduced brake pipe pressure allows the auxiliary reservoir pressure to actuate the triple valve 12, allowing high pressure air to flow from the auxiliary reservoir 10 through the brake cylinder pipe 17 to the brake cylinder 11 to apply the brakes. An increase in pressure in the brake pipe 13 actuates the triple valve to close the port to the auxiliary reservoir 10, and allow the air from the brake cylinder 11 to escape through the exhaust pipe 18. The invention interferes in no way with this usual use of the present systems.

The invention is applied to the above described system by connecting a by-pass pipe 19 between the brake cylinder 11 and the lateral pipe 15. This by-pass pipe 19 is controlled by means of an electric service valve 20, which may also control the exhaust pipe 18.

The service valve 20 is electrically operated and comprises a solenoid 21, the energizing of which, actuates an armature rod 22 connected with a slide valve member 23. As illustrated, the solenoid 21 moves the slide valve 23 in one direction and a spring 24 returns the valve in the other direction. The slide valve is enclosed in a suitable valve housing 43.

The valve housing 43 is arranged to receive the by-pass pipe 19 and the exhaust pipe 18. The slide valve member 23 is provided with a by-pass port 25 arranged to register with the by-pass pipe 19 and an exhaust port 26 arranged to register with the exhaust pipe 18 when the solenoid is energized. The solenoid is connected by means of a live conductor 39 with a source of electrical energy 42 and by means of a control conductor 40 with a switch contact 40' of a switch 41 in the engineer's cab. When the switch 41 is closed against the contact 40', the port 25 will align with the pipe 19 and when the switch is opened the spring 24 will return the port 26 to alignment with the exhaust pipe 18.

Let us assume that the engineer's valve is in the running position and that the brakes are released. If the engineer desires to apply all train brakes simultaneously he places his valve in the "lap" position to prevent escape of air from the brake pipe 13 and closes the switch 41 to contact 40'. This energizes the solenoids 21 of each car throughout the length of the train, causing all of the slide valves 23 on the train to be actuated simultaneously. This opens the by-pass pipes 19 of each car, allowing the brake pipe pressure to flow from the train line 13 directly into the brake cylinders 11. This pressure instantly starts application of all brakes. It also causes a reduction in pressure in the triple valve pipes 16 which actuates the triple valves to the service position, allowing air to flow through the brake cylinder pipe 17. The brakes throughout the length of the train are therefor instantaneously actuated.

After the initial movement, the switch 41 can be opened, and the engineer can control the braking through his usual valve and through the triple valves 12 in the ordinary manner. The exhaust port 26 is not a necessary part of the braking application, but may be employed simply as an economical measure to prevent initial wastage of air through the exhaust pipe 18. This wastage is caused by the fact that at the time air is first admitted through the by-pass pipe, the triple valve may be and usually is in the release position, having just completed exhausting air from the brake cylinder 11. Therefor, this initial air flowing back through the pipe 17 would exhaust through the pipe 18 for an instant before the triple valve acted. This is avoided by the port 26 which closes when the port 25 opens so as to prevent wastage of air through the exhaust pipe 18, until the contact 40' is opened to allow the usual pneumatic control of the brakes.

We have now described the braking action of the invention. It is also designed to provide simultaneous release of the brakes as well as application thereof. This is accomplished by installing on each car a releasing reservoir 27 connected by means of a releasing pipe 28 to the triple valve pipe 16 through a suitable T-fitting 29 or in any other desired manner. The releasing pipe 28 is controlled by an electrically operated releasing valve 30 shown in detail in Fig. 3. Pressure is supplied to the releasing reservoir 27 through a supply pipe 31 in which a check valve 32 is installed.

The releasing valve 30 is constructed similarly to the service valve 20, that is, it has an operating solenoid 33, an armature rod 34; a return spring 35 and a slide valve member 36. The slide valve member contains a port 37 which will open and close the releasing pipe 28. The solenoid 33 is connected to the live conductor 39 and to a second control conductor 38 with a second contact 38' at the switch 41. Thus throwing the switch 41 in one way will close the contact 40' and throwing it the other way will close the contact 38'. Ordinarily, the switch 41 is open and the slide valve member 36 is closed as shown in Fig. 3. Pressure is constantly supplied to the releasing reservoir 27 from the brake pipe 13 through the feed pipe 31 past the check valve 32. The latter prevents return flow.

Let us assume that the brakes are applied and that the engineer desires to release them simultaneously throughout the entire train length. He simply closes the switch 41 on the contact 38' which brings the ports 37 of all of the cars simultaneously in register with their releasing pipes 28. This allows pressure to flow from each of the releasing reservoirs 27 immediately into the triple valves 12, causing the latter to be simultaneously actuated to the full release position to discharge the air from all of the brake cylinders 11. This causes an instant initial release of the brakes and the amount of the release can be controlled by the engineer through his usual engineer's valve by controlling the pressure in the brake pipe 13. The releasing valves 30 need only be employed for the initial simultaneous actuation of the triple valves. They do not in any way interfere with the control of the latter by the engineer in the usual way.

The three conductors 38, 39 and 40 run throughout the length of each car and are provided with suitable attachment fittings at the car extremities so that they may be connected to the conductors of adjacent cars so as to be continuous throughout the length of the train. The switch 41 can be installed at any convenient position in the cab and the electrical supply 42 may be from a generator on the engine or tender.

It is desired to call attention to the following advantages of the invention over the usual air brake system. It allows greater pressure to be applied to the brake cylinders 11 than is present in the auxiliary reservoir 10, since the pressure can flow directly into the brake cylinders from the brake pipe 13 as long as service valves 20 are left open. The invention also allows the auxiliary reservoirs to be recharged without releasing the brakes. This can be done by placing the service valves 20 in the service position so as to maintain pressure in the brake cylinders, and placing the engineers valve in the full release and charging position, which will allow air to flow from the brake pipe to the auxiliary reservoir. When in this position, air can not discharge from the brake cylinders 11 since the discharge pipes 18 are closed by the service valve 20. If a car equipped with the invention is made up in a train not equipped, the usual operation of the brakes on the car in the usual way is not interfered with.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. The combination with an air brake system having a triple valve, an auxiliary reservoir, a brake cylinder, and a brake line; of a releasing reservoir; a pipe connecting said releasing reservoir direct to said triple valve; a lateral pipe connecting said first pipe with said brake line; means for supplying pressure to said releasing reservoir from said brake line; and an electrically operated valve positioned in said first pipe between said releasing reservoir and said lateral pipe.

2. The combination with an air brake system having a triple valve, an auxiliary reservoir, a brake cylinder, and a brake line; of a releasing reservoir; a pipe connecting said releasing reservoir direct to said triple valve; a lateral pipe connecting said first pipe with said brake line; means for supplying pressure to said releasing reservoir from said brake line; an electrically operated valve positioned in said first pipe between said releasing reservoir and said lateral pipe; means for supplying air from said triple valve to said brake cylinder; a bypass pipe between said brake line and said brake cylinder; and an electrically operated valve for controlling the flow through said by-pass pipe.

3. The combination with an air brake system having a triple valve, an auxiliary reservoir, a brake cylinder, and a brake line; of a releasing reservoir; a pipe connecting said releasing reservoir direct to said triple valve; a lateral pipe connecting said first pipe with said brake line; means for supplying pressure to said releasing reservoir from said brake line; an electrically operated valve positioned in said first pipe between said releasing reservoir and said lateral pipe; means for supplying air from said triple valve to said brake cylinder; a by-pass pipe between said brake line and said brake cylinder; an electrically operated valve for controlling the flow through said by-pass pipe; an exhaust pipe from said triple valve; and means for controlling the flow through said exhaust pipe by said latter electrically operated valve.

4. The combination with an air brake system having a triple valve, a brake cylinder, and a brake line; of a by-pass pipe extending between said brake line and said brake cylinder; an exhaust pipe extending from said triple valve; and an electrically operated valve positioned in both said by-pass pipe and said exhaust pipe so arranged that when said by-pass pipe is opened said exhaust pipe will be closed.

CLARENCE W. ICKES.
THEODORE P. ICKES.